UNITED STATES PATENT OFFICE 2,154,192

C-SUBSTITUTED PHENOLS AND PROCESS FOR MAKING SAME

Alois Zinke, Graz, Austria, assignor to the firm Beck, Koller & Company, Inc., Detroit, Mich.

No Drawing. Application April 15, 1936, Serial No. 74,595. In Austria May 7, 1935

10 Claims. (Cl. 260—624)

This invention relates to a process for preparing C-substituted phenols, according to which phenol or its homologues are condensed with cracked gasolines which contain compounds having multiple olefinic linkages.

One object of my invention consists in preparing phenols which are substituted by one or more hydrocarbon radicals having a relatively high number of aliphatic or alicyclic C-atoms, which phenols may serve for the preparation of oil-soluble phenol aldehyde resins.

Another object consists in producing resins of phenolic nature which may be immediately employed for preparing varnishes.

Another object of my invention consists in preparing gasolines of high quality. This forms the subject matter of my copending application Serial No. 103,213.

A process is known according to which sulfonated alkyl phenolic derivatives are first formed from a mixture of a phenol and olefines e. g. cracked petroleum hydrocarbons with the aid of strong sulfuric acid. After the reaction product is hydrolized a mixture consisting of a major proportion of alkyl phenols and a minor proportion of alkyl phenyl ethers is obtained. It is also known that phenols substituted in the nucleus may be obtained from chemically defined unitary unsaturated hydrocarbons and phenols with the aid of catalysts. Sulfuric acid and glacial acetic acid or hydrochloric acid and glacial acetic acid, aluminum chloride, ferric chloride, zinc chloride and the like metal halides with the simultaneous use of hydrogen halide may be employed as the catalysts.

Not all unsaturated hydrocarbons are equally capable of undergoing such reactions; those hydrocarbons apparently are mainly suited which by chemical addition of hydrogen halide or water form tertiary compounds. Thus such olefinic or polyolefinic substances are particularly adapted to undergo the said condensation reaction in which the double linkages are located at tertiary carbon atoms. I. e. the substances should contain one or more groups as indicated by the formula:

in which R and R' represent monovalent hydrocarbon radicals whilst R" and R'" may be such radicals or hydrogen.

Now I have found that highly desirable products may be obtained in a particularly suitable manner by condensing the unsaturated non-aromatic hydrocarbons, which are present in large quantities in cracked gasolines, with phenols with the aid of metal halides. In most cases the said unsaturated compounds can be taken up quantitatively by the phenol or at least mainly.

My invention is not only of great importance since valuable substituted phenols are obtained in a very economical way but also due to the fact that the hydrocarbons which do not enter the reaction are not deteriorated by the disturbing odor of cracked gasolines. Depending upon the origin and still more upon the process of the preparation of the cracked gasoline the above mentioned remaining hydrocarbons consist almost completely of benzene and its homologues or of mixtures thereof with hydrocarbons of paraffin nature or also mainly of the latter. I wish to mention particularly that all those unsaturated hydrocarbons which tend to autoresinification owing to a plurality of double linkages, participate in the reaction. It is easily to be understood that their elimination from cracked gasoline which serves as fuel for internal combustion engines is of great technical importance.

Particularly when using anhydrous aluminum or ferric chloride or other similarly behaving metal halides the addition of hydrogen halide may be dispensed with since traces thereof are usually formed due to the influence of humidity on the metal halide. Zinc chloride and other similarly behaving metal halides render the addition of a hydrogen halide necessary. It is, however, more advisable to use the latter in statu nascendi, which can be done e. g. by co-employing an acyl halide or more suitably a readily reactive hydrocarbon halide. Such a halide is e. g. a tertiary hydrocarbon halide or benzylchloride and the like.

For my process I may use common phenol, or its homologues, such as the cheap technical mixtures of cresols, xylenols; naphthols; polyhydroxybenzenes and polyvalent polynuclear phenols, e. g. dihydroxynaphthalenes. If substituted phenols intended for the preparation of pale resins are aimed at I prefer the use of common phenol and of cracked gasolines which do not contain polyolefinic substances. The substituted phenols obtained are readily and almost quantitatively distillable and are practically colorless in the distilled form. On the contrary thereto substituted phenols obtained from cracked gasoline rich in unsaturated hydrocarbons having a plurality of double linkages are, if at all, only in part distillable; if subjected to distillation in vacuo at least a considerable portion of the product remains behind as non-distillable, hard, resinous residue. This residue may also be immediately employed in the varnish industry particularly due to its very good solubility in drying oils. Resins of this kind having a pronounced phenolic character are often of particular value and importance on preparing oil varnishes.

While the condensation between the phenol and the monoolefinic portion of a cracked gasoline apparently takes place in practically invariable stoichiometric proportions i. e. more or less independent of the proportions employed, the polyolefinic hydrocarbons may interact with the phenol in various proportions. The ratio in which the components enter into combination within certain limits depends on the proportions used, the catalyst employed and the reaction temperature. The condensation reaction between the phenol and the polyolefine probably takes place in individual steps i. e. initially only by the mediation of a single double linkage, the phenolic body formed having an unsaturated substituent then polymerizes by the action of the catalyst (metal halide and hydrogen halide); or there may also be formed chainlike macro-molecules in consequence of the plurality of reactive places both in the polyolefine and in the phenol. The higher boiling polyolefinic portions of cracked gasolines are capable of yielding solid resins readily soluble in fatty oils directly (i. e. without eliminating low molecular condensation products by distillation in vacuo), particularly if relatively small proportions of phenol are employed.

The most volatile portions of cracked gasoline, which have a very low boiling point and may be gaseous at room temperature predominantly consist of unsaturated hydrocarbons having up to five carbon atoms. On passing hydrogen halide through the mixture of phenol and cracked gasoline they escape to a large portion if no special provision is taken. It is e. g. advisable to conduct them in conjunction with hydrogen halide over suitable contact agents and to separately collect the alkyl halides formed hereby and to condense only these with the phenol. The same reaction may of course also be carried out with all of the gasoline, this, however, being of no advantage as compared with directly reacting the phenol with the unsaturated hydrocarbons. They may also be passed through phenol in excess or more suitably through a reaction mixture in which in addition thereto there is formed hydrogen halide in statu nascendi. These volatile olefines may also be retained in another way viz. in that they are e. g. passed through tertiary alcohols. These are like all alcohols, suitable solvents, and by the action of hydrogen halide not only the tertiary halide corresponding to the alcohol but simultaneously also the addition product from hydrogen halide and olefine is formed. The volatile olefines may also be collected in a sufficient quantity of certain hydrocarbons such as dipentene, which, owing to their structure, are capable of forming addition products of hydrogen halide which in turn readily enter into reaction with phenol. The absorbed olefines then readily take part in this reaction which is due to the hydrogen halide in statu nascendi.

My process offers the considerable advantage that it may be carried out on commercial scale in iron apparatus. Apart from the economic advantage the process is also particularly readily performed in the presence of iron. Moreover my process as a rule leads to much paler products and to larger yields than hitherto known.

I wish to be understood that the following examples are only of illustrative character and that my invention is not restricted to the special features. A very large number of cracking processes is known, which may be perhaps divided into several characteristic groups. According to one method cracking is performed in the liquid phase with the application of more or less high pressure in the absence of special catalytic agents. The processes according to Ellis, Dubbs, Burton and others apparently are the most developed ones and may be regarded as representatives of this group. The cracked gasolines obtained by a process of this group contain saturated hydrocarbons and a varying proportion of olefinic hydrocarbons whilst no or only small proportions of aromatic hydrocarbons are present. Another method of which the processes developed by Gyro or by Knox may be regarded as examples, consists in exposing the oils to be cracked to particularly high temperatures in the vapor phase, generally without application of pressure. Slightly active contact masses may be present in some of these processes. The gasolines obtained are particularly rich in unsaturated hydrocarbons which mainly consist of olefinic, polyolefinic and aromatic hydrocarbons. A third group is characterized by the use of highly active catalysts such as aluminum chloride and by the application of relatively low temperatures mostly without pressure. The gasolines obtained have a relatively very low proportion of unsaturated hydrocarbons and therefore are of only slight interest for my process.

Finally I wish to state that any cracked gasoline rich in unsaturated non-aromatic hydrocarbons is suited for my process irrespective the method according to which it has been prepared and the origin of the stuff which has been cracked. Such stuffs are in the first place those petroleum fractions of low value more particularly the so-called gas oil which in general can neither be used as motor fuel nor for lubricating purposes and mostly serve as fuel oil; but also other oxygen-free or oxygen-containing more or less high molecular organic compounds of vegetable or animal origin, such as bituminous oils (shale oil, shale tar oil) or similar products such as are obtained from low-temperature carbonization of brown or black coal; waste fats and fatty oils.

Example 1

Gaseous hydrogen chloride is passed through a mixture of 1000 grms. gasoline of American origin obtained by cracking high boiling fractions of petroleum under pressure at temperatures surpassing 400° C. and in the absence of catalysts, 700 grms. phenol and 40 grms. aluminum chloride. The temperature is then increased to 80° C. and maintained for 16 hours. Thereupon the reaction mixture is freed from the portions of the gasoline and the phenol, which did not enter into reaction, by means of a current of steam; the separation may also be effected after washing by common distillation and subsequent vacuum distillation.

Thus about 380 grms. of gasoline which did not enter into reaction, 295 grms. of unaltered phenol and 705 grms. of a mixture of substituted phenols are obtained. The latter is of brown color and may be distilled in vacuo almost completely whereby a colorless product is obtained which is particularly suited for the preparation of oil soluble formaldehyde resins. The main quantity passes over between 150 and 250° C. (12 mm.).

The specific gravity of the original cracked gasoline is 0,723/15° C. The gasoline contains about 60 per cent unsaturated hydrocarbons, partly of aromatic, mainly, however, of olefinic nature, and about 40 per cent saturated hydrocarbons. The specific gravity of the recovered gasoline is 0,786/15° C. This gasoline consists of about 15 per cent unsaturated, mainly aromatic hydrocarbons and of about 85 per cent paraffin-hydrocarbons. It is completely relieved of the penetrating odor of the cracked gasoline.

The gaseous portions, i. e. about 320 g., which escape on carrying through the condensation, may be utilized in the way described in Example 2. The condensation may also be carried through at a lower temperature e. g. at 40° C., the reaction period being then suitably substantially protracted. The loss in gaseous portions is then substantially smaller. In this way also substituted phenols are obtained which yield aldehyde resins being by far more lightproof.

When replacing the cracked gasoline used in this example by any others obtained in an equivalent way, also if it is of another origin, e. g. Rouman, very similar results are obtained.

*Example 2*

The portions of the cracked gasoline passing over with the current of hydrogenchloride on carrying through the Example 1 are conducted together with the latter over a contact mass consisting of asbestos carrying bismuth chloride and collected in a receiver cooled by ice. The condensate obtained is brought into reaction with 200 grms. phenol in the presence of each 5 grms. aluminum chloride and zinc chloride at 60° C. for 12 hours. Instead of separately collecting the vapors in a receiver cooled by ice they may also be directly conducted into the phenol in the presence of the catalysts mentioned. The escaping vapors are conducted through a second receiver which is warmed at 50-60° C. and loaded with 6 grms. aluminum chloride and 100 grms. phenol.

After washing the reaction mixture with water and suitably further working up about 150 grms. of gasoline not entered into reaction, 160 grms. unaltered phenol and 250 grms. substituted phenols as well as about 10 liters of gaseous portions are obtained. The mixture of substituted phenols is of light brown color and after distillation in vacuo almost colorless. After protracted standing crystalline portions separate out which consist of p-tert. amylphenol.

The liquid or gaseous portions of the cracked gasoline which did not enter into reaction contain traces of halogen compounds. In case they are intended to be employed as motor fuel a further suitable treatment with alkalies is still required.

*Example 3*

Gaseous hydrogen chloride is passed through a mixture of 150 grms. U. S. P. cresol and each 4 grms. aluminum chloride and zinc chloride to the point of saturation (about 40 grms. being required therefore). 200 grms. of the cracked gasoline employed according to Example 1 are gradually added and the temperature is then increased to 50° C. and maintained for 12 hours. After suitably working up the reaction mixture about 85 grms. gasoline, 45 grms. cresol not entered into reaction and 90 grms. of a mixture of relatively high substituted phenols are obtained. About 10 liters of gaseous portions (about 30 grms.) escape during the condensation. The mixture of substituted cresols is of a rather pale-brown color and of middle-viscous appearance. The portion of the U. S. P. cresol which did not enter into reaction contains only a little m-cresol. The recovered gasoline shows equally advantageous properties and quite similar constants as that obtained according to Example 1.

*Example 4*

1000 grms. cracked gasoline of American origin which is obtained by cracking gas oil in the vapor phase without application of pressure and which practically completely consists of unsaturated aromatic and non-aromatic hydrocarbons, 800 grms. phenol and 40 grms. aluminum chloride are heated under a reflux condenser for 16 hours at 50-80° C. The gaseous portions escaping hereby are mixed with hydrogen chloride and are either first conducted over a contact mass consisting of asbestos carrying bismuth chloride, or directly into a mixture of 50 grms. phenol and 3 grms. aluminum chloride heated up to 100° C. The gaseous portions which also in this case remain uncombined are freed from hydrogen chloride and collected in a gasometer.

When worked up in a way as described in Example 1, about 810 grms. substituted phenols which have been formed almost completely in the first reaction vessel, 400 grms. phenol not entered into reaction and 560 grms. of portions of the cracked gasoline not entered into reaction are obtained. About 20 liters gaseous portions are collected in the gasometer.

The substituted phenols are of dark brown color and of viscous appearance. If subjected to distillation in vacuo 45-50 per cent of the phenols may be obtained in the form of a light colored distillate boiling between 100 and 250° C. (12 mm.). The portions having the lowest boiling point are thinly liquid, those having a higher boiling point viscous to resinous. The residue consists of a hard, dark resin which e. g. is readily soluble in drying oils and which may directly be employed for the preparation of oil varnishes in an advantageous manner. The specific gravity of the portions of the cracked gasoline which did not enter into reaction is 0,873. This gasoline consists almost entirely of benzene and homologues. They are absolutely free of the particularly disagreeable odor of the original cracked gasoline, the specific gravity of which is 0,838.

*Example 5*

The cracked gasoline employed according to Example 4 is divided in two approximately equally large parts by distillation up to 85° C. About 5 per cent of gaseous portions are collected separately.

500 grms. of the fraction boiling up to 85° C., 200 grms. phenol and 6 grms. zinc chloride are warmed up to 40° C. and 10 grms. tert. butyl-chloride are added gradually. Thereupon the reaction mixture is maintained at this temperature for further 48 hours.

About 280 grms. substituted phenols, 90 grms. phenol not entered into reaction and 300 grms. of unaltered portions of the fraction of the cracked gasoline in addition to 10 liters of gaseous portions which have already been collected during the reaction, are obtained after suitably working up the reaction mixture.

The substituted phenols obtained according to this example are of dark brown color. Also after distillation in vacuo there remains a considerable amount of a hard resinous residue of similar properties to that obtained according to Example 4.

The liquid portion of the cracked gasoline which does not enter into reaction consists almost entirely of benzene. Under otherwise equal conditions the yield of substituted phenols is only about 50 grms. if no butyl chloride is co-employed; the yield is not substantially increased even if hydrogen chloride or the like is simultaneously employed. Instead of tert. butyl-chloride there may also be employed another tertiary chloride or a tertiary dichloride, such as dipentene dihydrochloride or benzyl chloride and the like. When employing aluminum chloride instead of zinc chloride, however, the yield of substituted phenol is about equal to that achieved hereinbefore by means of zinc chloride and butyl chloride, also without employing butylchloride or similarly acting halides.

*Example 6*

6 grms. aluminum chloride are added in small portions to a mixture of 200 grms. of the fraction boiling above 85° C. of a cracked gasoline of American origin and 100 grms. technical xylenol boiling between 107 and 117° C. The mixture is heated for 48 hours at 50–60° C. after the considerable self-heating has ceased.

The reaction mixture is freed from the unaltered portions of the cracked gasoline (120 grms.) by distillation after having been washed with water. These portions almost completely consist of toluene and xylenes. The remaining mixture of substituted phenols (175 grms.) together with the unaltered portions of xylenols contained therein may serve for the production of readily oil soluble aldehyde resins.

*Example 7*

500 grms. of the gasoline fraction used in Example 6 are condensed with 100 grms. phenol by adding 2 grms. zinc chloride and 2 grms. ferric chloride and 10 grms. dipentene hydrochlorides obtained by introducing hydrochloric acid into dipentene. The condensation is first carried out at about 60° C. in a flask provided with a reflux condenser, the temperature being raised after a few hours at about 100° C. and maintained for 24 hours. A small portion of the low boiling inactive part of the gasoline is distilled off hereby. After washing the reaction mixture and distilling off the portion of the gasoline which did not enter the condensation reaction, about 300 grms. of a hard resin are obtained, which is readily soluble in drying oils and petroleum hydrocarbons. The phenol had been compounded practically quantitatively. The uncombined part of the gasoline mainly consists of aromatic hydrocarbons and only to a very small extent of olefinic, apparently monoolefinic hydrocarbons, which, however, are free of any disturbing odor.

*Example 8*

100 grms. of dihydroxy naphthalene (1,8) are condensed in a way analogous to that described in the preceding example with 300 grms. of the total fraction boiling above 100° C. of a cracked gasoline of the type described in Example 1. About 200 grms. of a viscous phenolic condensation product are obtained which can not be distilled without decomposition. It may serve for the preparation of aldehyde resins showing special properties.

What I claim is:

1. A process for producing, on the one hand, resinous alkyl-substituted phenols which are readily soluble in drying oils and hydrocarbons, and on the other hand, liquid hydrocarbons substantially free from unsaturated olefinic portions and alkyl-substituted phenols, in a single working step from cracked gasoline which contains a substantial proportion of reactive compounds of a highly unsaturated character, obtained by cracking in the vapor phase a high molecular substance which is a member of a group consisting of high boiling and non-volatile petroleum fractions, shale oil, and brown coal tar oils; which process comprises reacting said cracked gasoline by the Friedel-Crafts' synthesis with a phenol in substantial excess over the quantity equimolecular to the olefinic portion of the cracked gasoline, and separating out the alkyl-substituted phenols.

2. A resinous alkyl-substituted phenol soluble in drying oils and hydrocarbons produced according to claim 1.

3. A resinous phenol readily soluble in drying oils and hydrocarbons obtained by reacting, by the aid of a metal halide catalyst, a cracked gasoline which contains a substantial proportion of reactive compounds having a highly unsaturated character and which is obtained by cracking in the vapor phase a high molecular substance which is a member of the group consisting of high boiling and non-volatile petroleum fractions, shale oil and brown coal tar oils with a phenol in substantial excess over the quantity equimolecular to the said reactive compounds contained in the cracked gasoline.

4. A process for preparing substituted phenols which consists in reacting a phenol with a cracked gasoline which contains a substantial proportion of compounds having olefinic linkages, in which process both a hydrogen halide and a metal halide which is a member of a group consisting of the chlorides of aluminum, iron and zinc, are used as catalysts, the formation of the hydrogen halide taking place in situ.

5. A process for preparing substituted phenols which comprises reacting a phenol with a cracked gasoline which contains a substantial proportion of compounds having olefinic linkages, in which process both a hydrogen halide and a metal halide which is a member of a group consisting of the chlorides of aluminum, iron and zinc, are used as catalysts, the hydrogen halide being formed in statu nascendi by employing a readily reactive organic halide in catalytic proportions.

6. A process which consists in reacting, with the aid of a metal chloride selected from the group consisting of the chlorides of aluminum, iron and zinc, a phenol with organic halides formed by catalytically effected addition of hydrogen halide to a cracked gasoline the formation of the hydrogen halide taking place in situ.

7. A process according to claim 6, in which only the easily volatile fraction of the cracked gasoline, in conjunction with hydrogen halide, is conducted over catalytic agents whereby organic halides are formed from the unsaturated portions.

8. A process in which a hydrogen halide and the easily volatile fraction of a cracked gasoline containing a substantial proportion of compounds having olefinic linkages, are conducted into relatively high boiling liquid stuffs consisting of absorbing solvents selected from the group consisting of tertiary alcohols and unsaturated hydrocarbons which readily form reactive halides with hydrogen halide, whereupon the mixture containing organic halides and indifferent organic compounds, after being separated from any water present, is reacted with a phenol, with the aid of a metal halide.

9. A process which consists in conducting the readily volatile fraction of a gasoline which contains a substantial proportion of compounds having olefinic linkages, into unsaturated hydrocarbons which readily form reactive halides by addition of a hydrogen halide, and reacting the admixture with a phenol in excess of the equimolecular proportion in the presence of a hydrogen halide and of a metal halide which is a member of a group consisting of the halides of aluminum, iron and zinc.

10. A process for preparing substituted phenols which comprises reacting a phenol with a gasoline which contains a substantial proportion of compounds having olefinic linkages in which process both a hydrogen halide and a metal halide which is a member of a group consisting of the chlorides of aluminum, iron and zinc, are used as catalysts, the formation of the hydrogen halide taking place in situ.

ALOIS ZINKE.